2 Sheets—Sheet 2.
J. S. HULL.
CAN SOLDERING MACHINE.
No. 268,022. Patented Nov. 28, 1882.
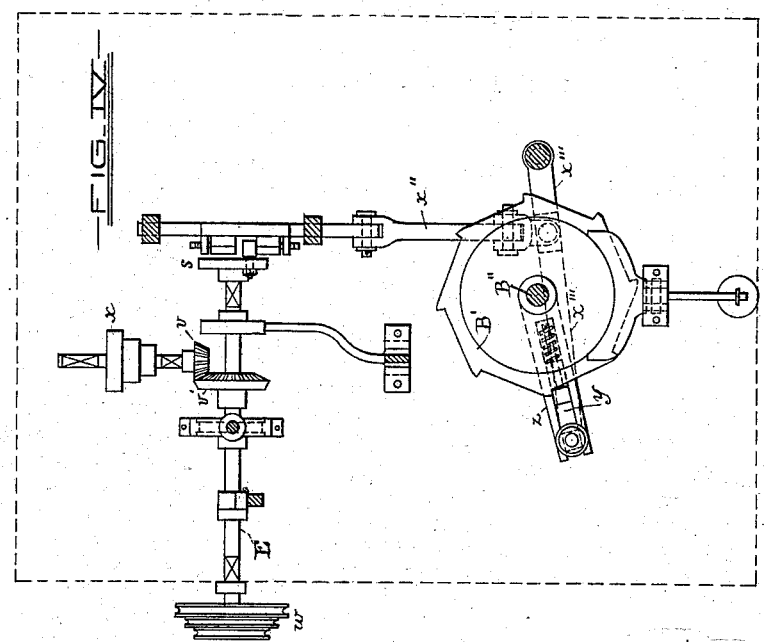
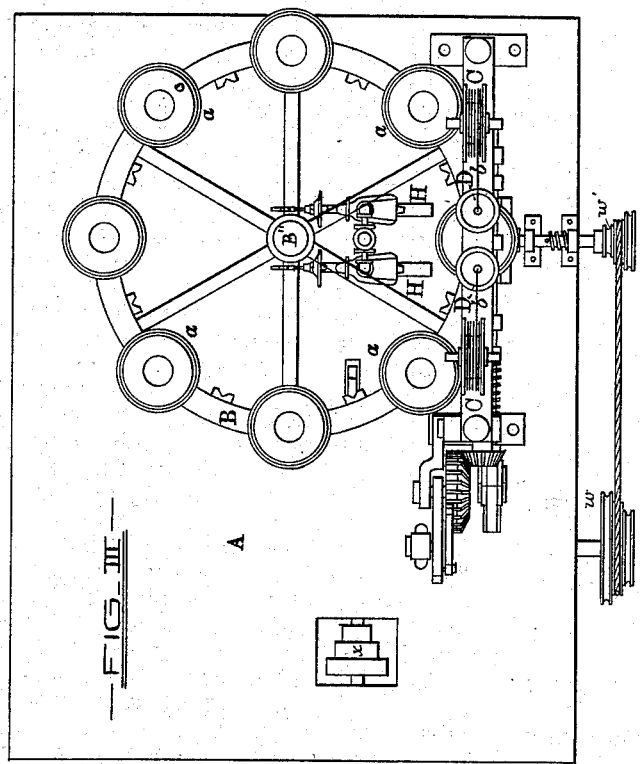
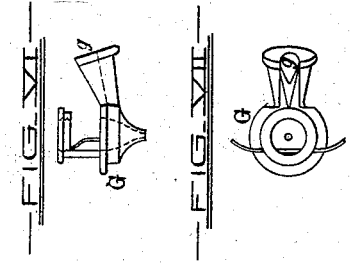
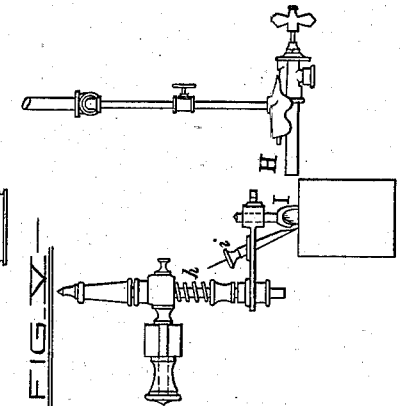

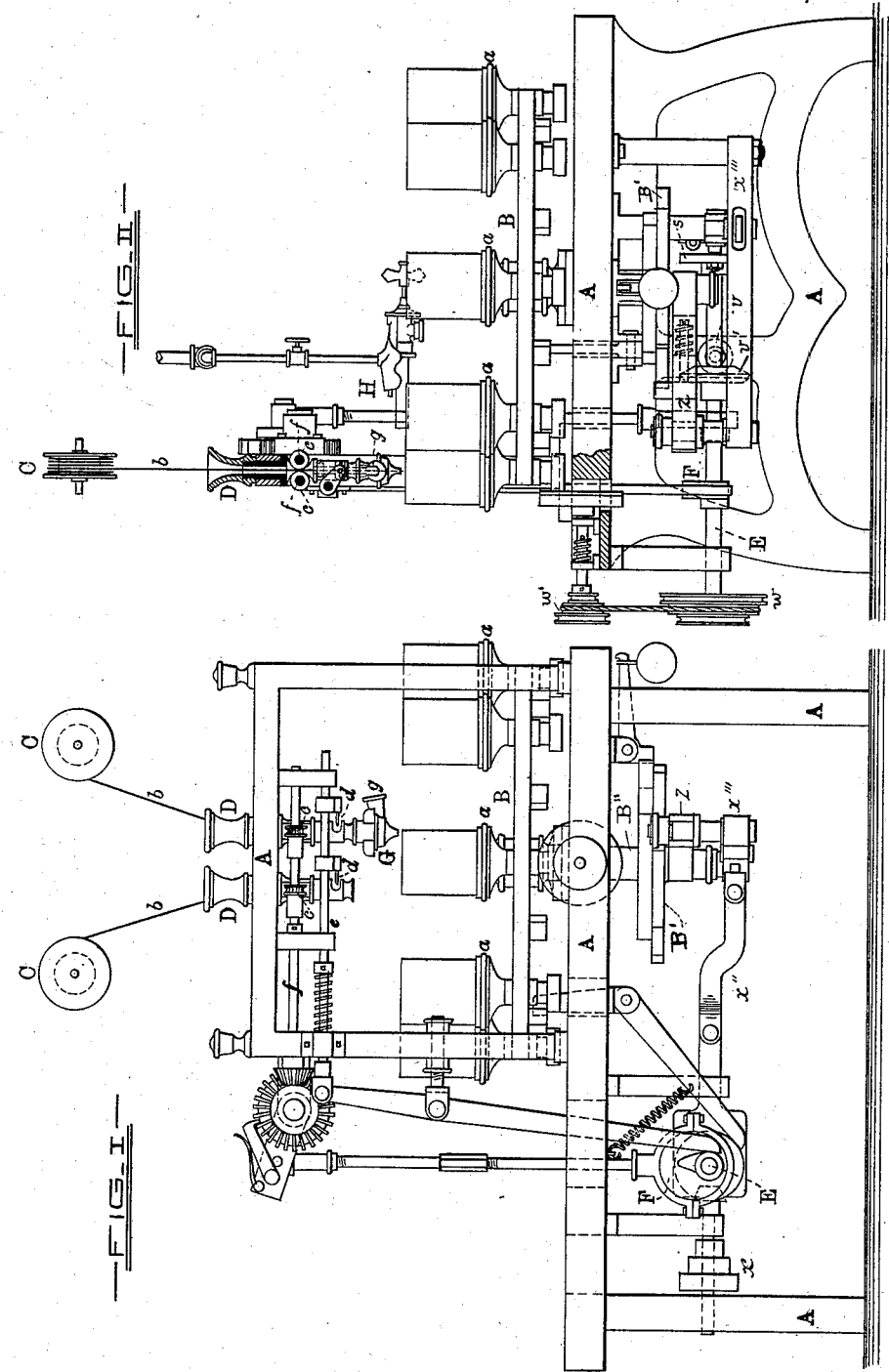

UNITED STATES PATENT OFFICE.

JOHN S. HULL, OF BALTIMORE, MARYLAND.

CAN-SOLDERING MACHINE.

SPECIFICATION forming part of Letters Patent No. 268,022, dated November 28, 1882.

Application filed May 1, 1879.

*To all whom it may concern:*

Be it known that I, JOHN S. HULL, of the city of Baltimore and State of Maryland, have invented certain Improvements in Can-Soldering Machines, of which the following is a specification; and I do hereby declare that in the same is contained a full, clear, and exact description of my said invention, reference being had to the accompanying drawings, and to the letters of reference marked thereon.

This invention relates to certain improvements in those parts of the machine which co-operate to conduct the solder in suitable quantities and in a melted condition to the revolving cans, and, further, to the application to the machine of soldering devices, whereby the same is adapted as a can-capping machine.

The said invention consists, first, in novel appliances for conducting the solder, in the form of wire, to knives, which sever the same into pieces of suitable size; secondly, in combining with the said conducting appliances the said knives and the mechanism for operating them; and, thirdly in the combination of the mechanism above referred to and a capping soldering-block having a channel whereby wire solder is applied to the outer surface thereof, as will hereinafter fully appear.

In the further description of my invention which follows reference is made to the accompanying drawings, forming a part hereof, and in which—

Figures I and II are exterior views, as seen from different points, of a can-soldering machine embodying my improvements. Fig. III is a plan view of the machine. Fig. IV is a plan view of parts of the machine. Figs. V, VI, and VII are views on an enlarged scale of parts of the invention.

Similar letters of reference indicate similar parts in all the views.

The machine to which my improvements are applied is one in which the cans to be soldered are successively brought under the soldering devices, and after the soldering operation is completed automatically removed therefrom; and in order that a full understanding may be had of the relation which my said improvements bear to the portions of the machine to which I make no claim of invention, I show in the said drawings a complete machine, and will describe in a general way the operations of the same.

A is the frame or stand of the machine, and B a revoluble table having disks $a$, which are revolved independently of the table, and upon which the cans to be soldered are seated. The table is intermittingly moved by means of a ratchet-wheel and pawl driven by suitable mechanism. A plan view of this mechanism is shown in Fig. IV of the drawings. Motion is applied to the cone-wheel $x$, which, through the medium of the gearing $v\ v'$, effects the revolution of the shaft E, upon which is placed the crank-wheel $s$. This in turn imparts motion to the connecting-link $x''$, and to the arm $x'''$, which gives a vibratory or oscillatory movement to the crank-arm $z$. To this crank-arm is applied a spring-pawl, $y$, which engages the teeth of the ratchet-wheel B', the ratchet-wheel being mounted on the vertical shaft B'', to which the table B is secured. The grooved pulleys $w$ on the shaft E by means of a band rotate the pulleys $w'$ of the shaft which carries the devices for giving rotary movement to the disks or can-seats. One disk only is rotated on its axis—viz., the one which at the time is directly below the soldering devices, and this motion is imparted to the said disk through the medium of devices which are shown in the drawings, but which need no special description herein, as they form no part of my present invention. As before stated, wire solder is used, and the wire (represented by $b$) is coiled upon reels or spools C, suspended in any convenient place adjacent to the machine. The free ends of the wire are introduced to tubes D, and the wire is drawn down the said tubes by means of milled rollers $c$, two of which are applied to each one of the tubes, the said tubes being slotted to admit of this action.

The knives which cut the wire solder into pieces as it passes downward through the tubes D are denoted by $d$; and it will be seen that the said tubes are notched to expose the solder to the cutting-edges of the knives. The said knives are rigidly attached to a shaft, $e$, which receives longitudinal motion from a revolving shaft, E, through the medium of a cam and lever. The shaft E is also provided with an eccentric, F, which actuates the shaft $f$, to which the milled rollers $c$ are secured. The lower ends of the tubes D terminate in dishes G, one only of which is shown, having conical bottoms centrally perforated, to allow the pieces of solder which are severed from the wires and melted by the action of flames from the burners H upon the said dishes to drop upon the can to effect the soldering of the top and bottom thereof.

The movements of the several parts of the machine which affect the wire solder are such as to cause solder to be applied to the can only at such times as are necessary, and the quantity of solder dropped to a can is regulated so as to avoid waste of material, and at the same time provide sufficient to complete the securing of the top and bottom of the same.

The dishes G are provided with lateral apertures $g$, into which wire or granulated solder may be continuously fed, if such arrangement is preferred.

It will be understood that when the solder is fed directly to the dishes the knives $d$ are unnecessary.

Upon a can being brought under the soldering devices it is revolved, and during its revolution it is heated by the jets of flame issuing from the burners H. After the can is sufficiently heated, solder is dropped in a melted condition from the perforated dishes G, and flows around the can-head, closing the seam. The can then passes around and from under the soldering devices and an unsoldered can takes its place. From this it will be seen that the soldering operation is a continuous one, and the production of the machine for an hour or other period of time may be easily computed. The feeding of the solder is also accomplished with mechanical precision; the cutting of the wire into pieces, and the melting of the severed ends of the wire in passing through the dishes, which are heated by the flames which heat the can, being regulated by devices which allow of no variation while the machine is in operation.

In order to adapt the machine to the capping of cans, I suspend a circular soldering-block, I, from some part of the frame A, the said block being self-adjusting in height by means of the spring $h$. This block has combined with it a solder-conducting tube, $i$, through which wire solder is conveyed to the exterior of the same. The soldering-block and its solder-conducting tube are heated in the heating of the cans, as before described.

Having thus described my invention, what I claim as new, and wish to secure by Letters Patent of the United States, is—

1. The combination, in a soldering-machine, of a solder-tube having a longitudinal slot, wheels with their faces confronting each other within the slot, and mechanism to operate one of the wheels, substantially as set forth.

2. The combination of a solder-tube, a solder-feed wheel mounted on a horizontal shaft, a ratchet-wheel adapted to turn the said shaft, a pawl mounted on a pivoted lever in such manner as to engage with the ratchet-wheel, an eccentric wheel, and means to connect the said lever and eccentric wheel, whereby the rotation of the eccentric gives to the solder-feed wheel an intermittent motion, substantially as set forth.

3. In a soldering-machine, the combination of a solder-tube, a horizontal slide-shaft, a solder-cutting knife secured to the slide-shaft, a spring attached to the shaft in such a manner as to keep the shaft, with the knife, normally retracted from the solder-tubes, a pivoted lever attached to the shaft, and a cam in such a position as to move the lever, whereby power applied to rotate the cam causes the knife to cut the solder, substantially as set forth.

4. In a soldering-machine, the combination of a device to feed the solder wire with an intermittent movement, a solder-cutting knife, a movable table provided with can-seats, and mechanism, as described, to operate the said parts, whereby each part is made to perform its function in proper sequence, substantially as set forth.

JOHN S. HULL.

Witnesses:
WM. T. HOWARD,
WM. C. NICHOLLS.